US008021776B2

(12) United States Patent
Habecke

(10) Patent No.: US 8,021,776 B2

(45) Date of Patent: Sep. 20, 2011

(54) HOLDING AND CONTACT-MAKING APPARATUS FOR A BUTTON CELL, AND METHOD FOR ITS PRODUCTION

(75) Inventor: Matthias Habecke, Hattingen (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 1154 days.

(21) Appl. No.: 11/719,260

(22) PCT Filed: Nov. 18, 2005

(86) PCT No.: PCT/EP2005/012372

§ 371 (c)(1),
(2), (4) Date: May 14, 2007

(87) PCT Pub. No.: WO2006/056369

PCT Pub. Date: Jun. 1, 2006

(65) Prior Publication Data

US 2009/0073001 A1 Mar. 19, 2009

(30) Foreign Application Priority Data

Nov. 23, 2004 (EP) .................................... 04027809

(51) Int. Cl.
*H01M 2/10* (2006.01)
*B60R 25/10* (2006.01)
*H01R 11/00* (2006.01)

(52) U.S. Cl. .............. 429/97; 429/96; 429/98; 429/100; 340/426.13; 439/504

(58) Field of Classification Search .................. 429/157, 429/96, 97, 98, 100; 439/500, 504; 340/426.13
See application file for complete search history.

(56) References Cited

U.S. PATENT DOCUMENTS 4,487,820 A 12/1984 Engelstein et al.
(Continued)

FOREIGN PATENT DOCUMENTS

DE 697 04 787 9/2001
(Continued)

OTHER PUBLICATIONS

International Search Report and Written Opinion corresponding to PCT/EP2005/012372, under date of mailing of Apr. 6, 2006.

*Primary Examiner* — Patrick Ryan
*Assistant Examiner* — Julian Anthony
(74) *Attorney, Agent, or Firm* — Quarles & Brady LLP

(57) ABSTRACT

The invention relates to a maintaining and contacting device for a round cell battery and to the use of said type of maintaining and contacting device in remote control devices in order to lock and unlock motor vehicles. According to said type of devices, the battery area must be separated as much as possible from other electronic components in order to prevent destructive contact. Spring clips, which are connected to the electronic system by means of a cable and soldered connections, are used in order to make contact with the upper and lower side of the round cell battery. Leaf-spring like contact elements, which are connected to the battery area forming a non-positive fit connection with an electronic module which is to be supplied, are used in order to prevent a complex construction and in order to enable the battery area to be accessed in an easy manner.

17 Claims, 5 Drawing Sheets

U.S. PATENT DOCUMENTS

| | | | | |
|---|---|---|---|---|
| 5,922,489 | A | 7/1999 | Adachi | |
| 5,980,309 | A * | 11/1999 | Frantz et al. | 439/500 |
| 6,182,484 | B1 | 2/2001 | Wolter | |
| 6,424,301 | B1 * | 7/2002 | Johnson et al. | 343/702 |
| 6,436,569 | B1 | 8/2002 | Dijkstra et al. | |

FOREIGN PATENT DOCUMENTS

| | | |
|---|---|---|
| DE | 101 17 759 | 10/2001 |
| DE | 202 19 477 | 4/2003 |
| EP | 0 580 886 | 7/1992 |
| JP | 2004039347 | 2/2004 |

* cited by examiner

HOLDING AND CONTACT-MAKING APPARATUS FOR A BUTTON CELL, AND METHOD FOR ITS PRODUCTION

CROSS REFERENCES TO RELATED APPLICATIONS

This application claims priority to and is a national stage of PCT/EP2005/012372 titled "Maintaining and Contacting Device for a Round Cell Battery and Method for the Production Thereof" filed on Nov. 18, 2005, which claims priority to EP 04027809.5 filed on Nov. 23, 2004.

STATEMENT REGARDING FEDERALLY SPONSORED RESEARCH

Not applicable.

BACKGROUND

The present invention relates to a holding and contact-making apparatus for a button cell, in particular to the use of a holding and contact-making apparatus such as this in remote-control apparatuses for locking/unlocking of motor vehicles, with the contact-making apparatus being used to supply electrical power to the electronics of a remote-control device such as this.

Known electronic keys generally have button cells in order to supply power to the electronics section with its transmitter and receiver modules, and these button cells are in some cases held directly by means of holding apparatuses on boards for the electronic elements. Because of the problem that the operator can damage the electronics that are exposed after disassembly of the key accidentally when replacing a battery, for example by a mechanical influence or electrostatic influence, the electronic areas are shielded by means of battery holders in the form of housings. When replacing a button cell, the operator has access only to the battery housing.

Button cells have an upper face and a lower face which are also used to transmit power, with each face representing one specific pole. In addition, the projecting faces can be used to make contact with a pole.

A half-open housing such as this is known from DE 34 19 333. Contact is made by means of electrical contacts which are passed through the bottom of the housing to the electrical component. The electrical contact are in this case inserted from the open face of the housing, and are soldered to the board.

This form of assembly is complex and expensive for the mass production of electronic keys for motor vehicles.

SUMMARY

The present invention is therefore based on the object of designing a holding and contact-making apparatus, in particular for use in remote-control apparatuses for locking/unlocking of locks and closures of motor vehicles, so as to allow simple assembly of the holding apparatus in its own right, and subsequent installation in the remote-control apparatus.

BRIEF DESCRIPTION OF THE DRAWINGS

One exemplary embodiment of the invention is illustrated schematically in the drawings, in which.

DETAILED DESCRIPTION OF THE PREFERRED EXAMPLE EMBODIMENT

Figure 1:
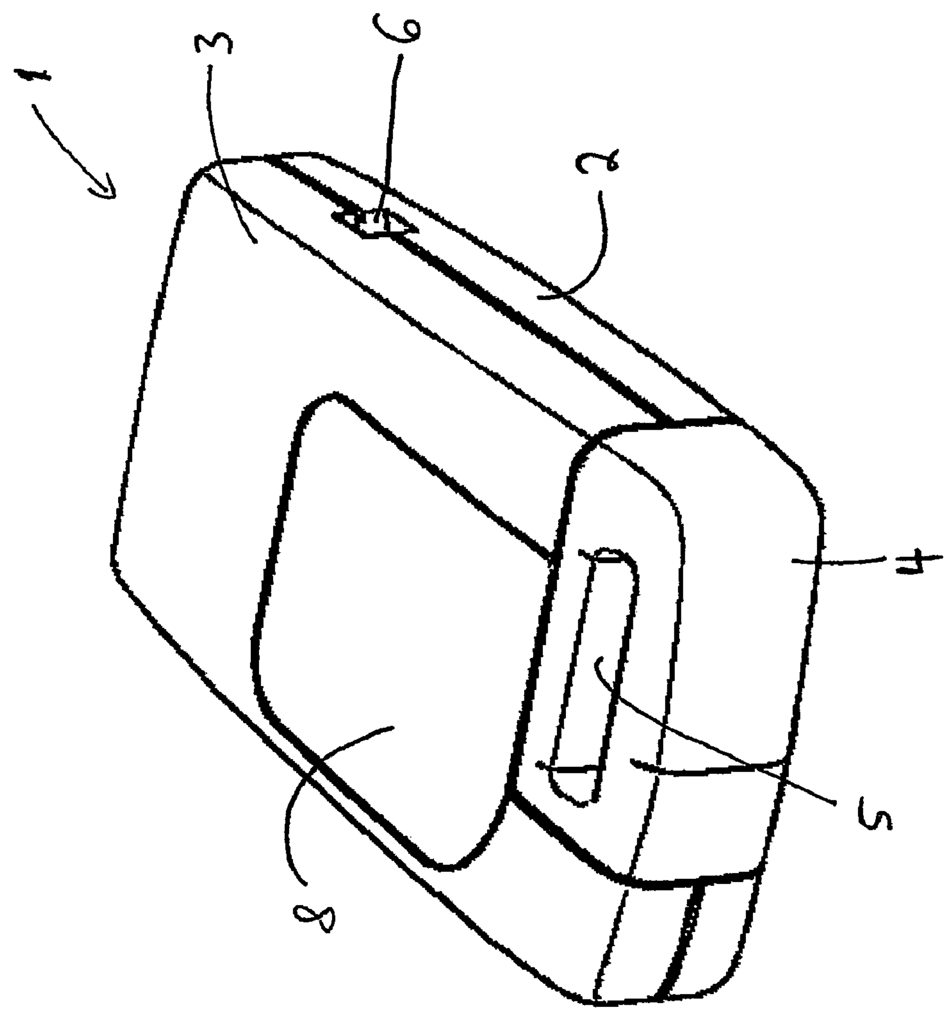
FIG. 1: shows a perspective view of a remote-control device for locking/unlocking of locks and closures on motor vehicles.

FIG. 1 shows a remote-control apparatus 1 for locking or unlocking of locks and closures on motor vehicles, in the form of a perspective view in assembled form. This electronic key 1 comprises an upper shell 2 and a lower shell 3, as well as a mechanical emergency key 4 inserted in it. In its grip section, the emergency key 4 has a recess 5 for use as a key attachment. The emergency key can be unlocked on operation of a button or slide which is arranged on the front face of the electronic key 1 or emergency key so that in an emergency, for example in the event of a power failure in the vehicle, it can be removed from the remote-control apparatus 1. An emergency lock cylinder located on the vehicle would then be operated in order to enter the vehicle without radio communication, in order to rectify problems.

Corresponding buttons are located on the upper shell of the remote-control apparatus 1, whose operation initiates the desired functions, such as opening or locking of the vehicle. Furthermore, the necessary electronics, such as antennas, transmitter and receiver modules and possible evaluation units for creation and processing of code signals, are located within the upper shell 2 and the lower shell 3.

An electronic key such as this can, if required, also be used without key operation for automatic opening of a motor vehicle just by approaching the vehicle. The approach is detected by sensors on the vehicle, thus initiating code communication between the remote-control apparatus 1 and the motor vehicle. Once the code has been successfully interchanged, the vehicle control unit, for example, causes the door locks to be unlocked.

The remote-control apparatus in the vehicle is normally incorporated as an authorizing element in an ignition and starter switch, for example in the dashboard of the vehicle. For latching of the electronic key 1, it has latching depressions 6 on the side surfaces.

A holding and contact-making apparatus 7 is integrated in the lower shell 3, and this represents the housing. This is covered on the outside by a battery compartment cover 8. After removal of the emergency key 4, the battery compartment cover 8 can be removed in a simple manner, in order to allow replacement of the button cells.

The upper shell and lower shell are joined together by normal connection methods after completion with electronics and other necessary components, for example by adhesive bonding, friction welding or latching.

Figure 2:
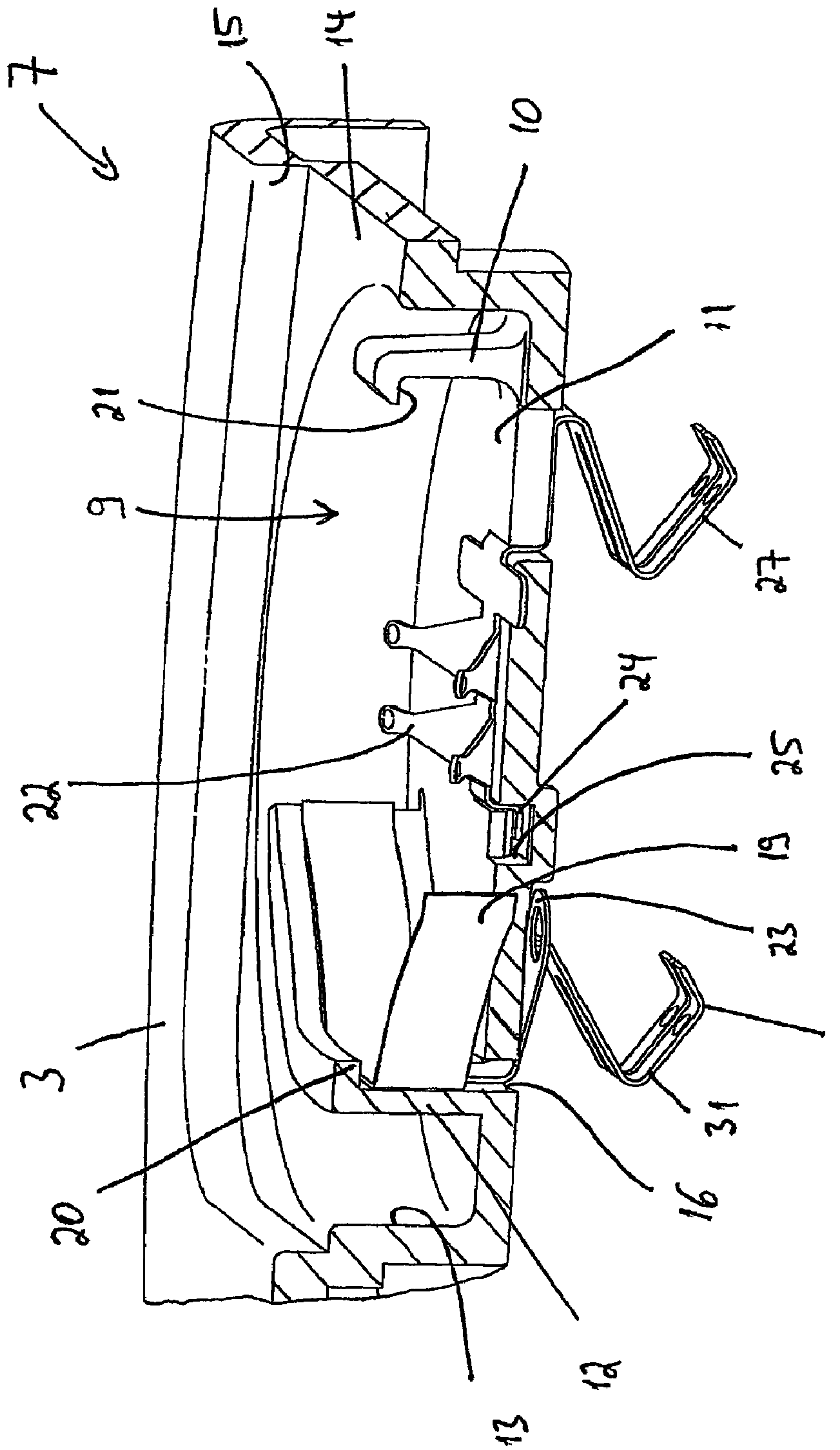
FIG. 2: shows a perspective view of a holding and contact apparatus for a button cell in the form of a section

FIG. 2 shows the subarea of the lower shell 3 with the integrated holding and contact-making apparatus 7 for holding a button cell for the electrical power supply for the electronics assembly, which is arranged in the upper shell.

The holding and contact-making apparatus 7 is formed integrally with the holding trough 9.

The parts are composed of plastic and are produced in one process, by plastic injection-molding. A sprung holding hook 10 is arranged in the holding trough 9, and is formed integrally from the bottom 11 of the holding trough 9.

Furthermore, a holding wall 12 is arranged opposite the elastic holding hook 10, which holding wall is at right angles to the bottom 11 of the trough and is also formed from the bottom 11. This holding wall could be covered by the trough wall 13 for the purposes of a different environment. The holding wall 12 is arranged in a C-shape so that it surrounds a radial part of a button cell and thus acts as an opposing bearing against the prestressing force that acts on the button cell through the holding hook 10. At the upper end, the holding wall has a projection edge 20 pointing towards the center of the holding trough 9, which edge holds a button cell that has been inserted in an interlocking manner, in the holding trough 9. A button cell that has been inserted is thus held in an interlocking manner by the projection edge 20 and the hook projection 21.

A button cell which has been inserted is prestressed against the projection edge 20 and the hook projection 21 via spring contact elements 22 of a first contact element 18, so that it makes a reliable contact with the button cell and positions the button cell sufficiently securely.

In order to remove a button cell, the elastic holding hook 10 is bent in the direction of the nearest trough wall 13. The interlock is cancelled and the button cell can be removed, once the battery compartment cover has been removed. The battery compartment cover rests on the surface 14, and is gripped by the side surface 15.

An elongated bottom recess 16 in the form of a slot is provided in the bottom 11 of the holding and contact-making apparatus 7, and extends along the holding wall. The bottom recess 16, which is in the form of a slot, is arranged on that side of the trough wall which faces the center of the holding trough 9. This is used to allow a first contact element to be fitted.

For this purpose, the contact lugs for making contact with the side of a button cell are pushed into the internal area of the trough wall 13 through the slot 16 from that side of the bottom 11 of the holding and contact-making apparatus 7 which is averted from the holding wall 12, and are attached from underneath.

Figure 6:
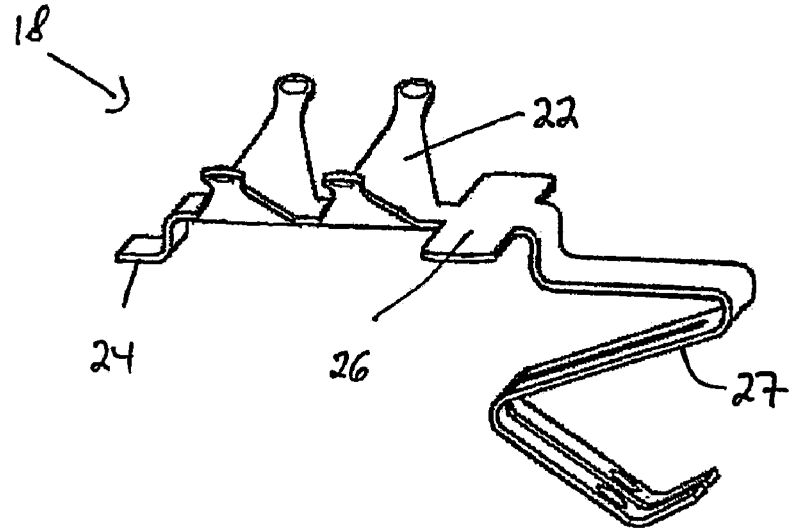
FIG. 6: shows a perspective view of the second contact element.

FIG. 6 shows the first contact element 18 as a single part. This is a prebent leaf-spring element. The construction process starts with an attachment projection 24, which snaps into a depression 25 once the contact element has been fitted. This makes any backward movement, that is to say the removal of the contact element 18 from the operating position, impossible.

The spring contact elements 22 are connected to the attachment projection and make contact with the button cell with a defined spring force. After this, a contact plate 26 is connected, by means of which the contact element can additionally be supported over a large area against the bottom 11 of the apparatus 7. A sheet-metal spring section 27, which is bent in an S-shape and forms the contact with the electronics assembly of the remote-control apparatus 1 through a second recess 28 in the installed state, is then connected.

Figure 5:
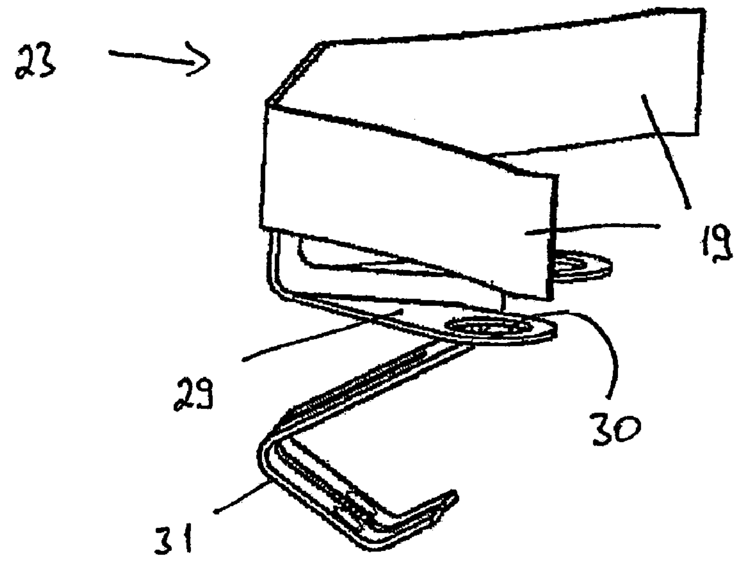
FIG. 5: shows a perspective view of the first contact element.

FIG. 5 shows the second contact element 23, which has two large-area contact lugs 19 by means of which contact is made with the side surfaces of the button cell.

This area is introduced from the lower face of the bottom 11 into the internal area of the holding trough 9 until the contact sections 29 rest on the outside of the holding trough 9. A small material projection on the holding trough 9 then projects through the hole recesses 30 and, after insertion, is hot-stamped in place by means of a die, so that the plastic material 32 surrounds the contact section and thus secures the second contact element in an interlocking manner in the installed position.

In the same way as the first contact element 23, a sheet-metal spring section 31 which has been bent in an S-shape for making contact with the electronics assembly extends and reaches the contact section 29.

Both the contact elements 18, 23 are prebent components, which are inserted into the holding trough 9. The use of components such as these avoids the need for the complex bending process, as is otherwise required, of contact sheet-metal spring sections in the installed state. Particularly in the case of mass-production quantities in the automobile field, this makes it possible to produce a holding and contact-making apparatus economically.

Figure 3:
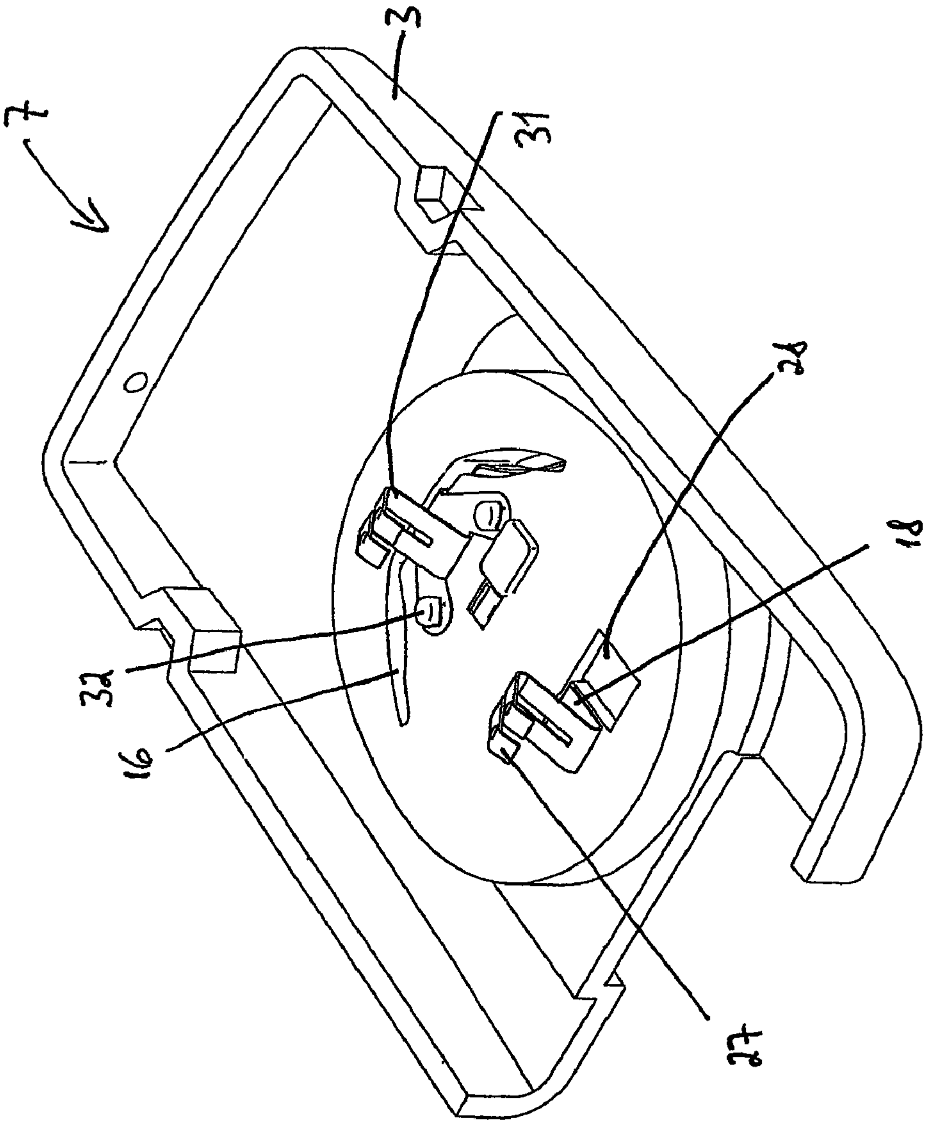
FIG. 3: shows a perspective view of the apparatus from the underneath

FIG. 3 shows a perspective view of the completely preassembled lower shell 3 from the underneath. The sheet-metal spring section 27 of the first contact element is passed through the second recess 28 in the bottom 11 of the holding trough 9 from the inside of the holding trough 9, and is moved laterally to the illustrated position.

Figure 4:
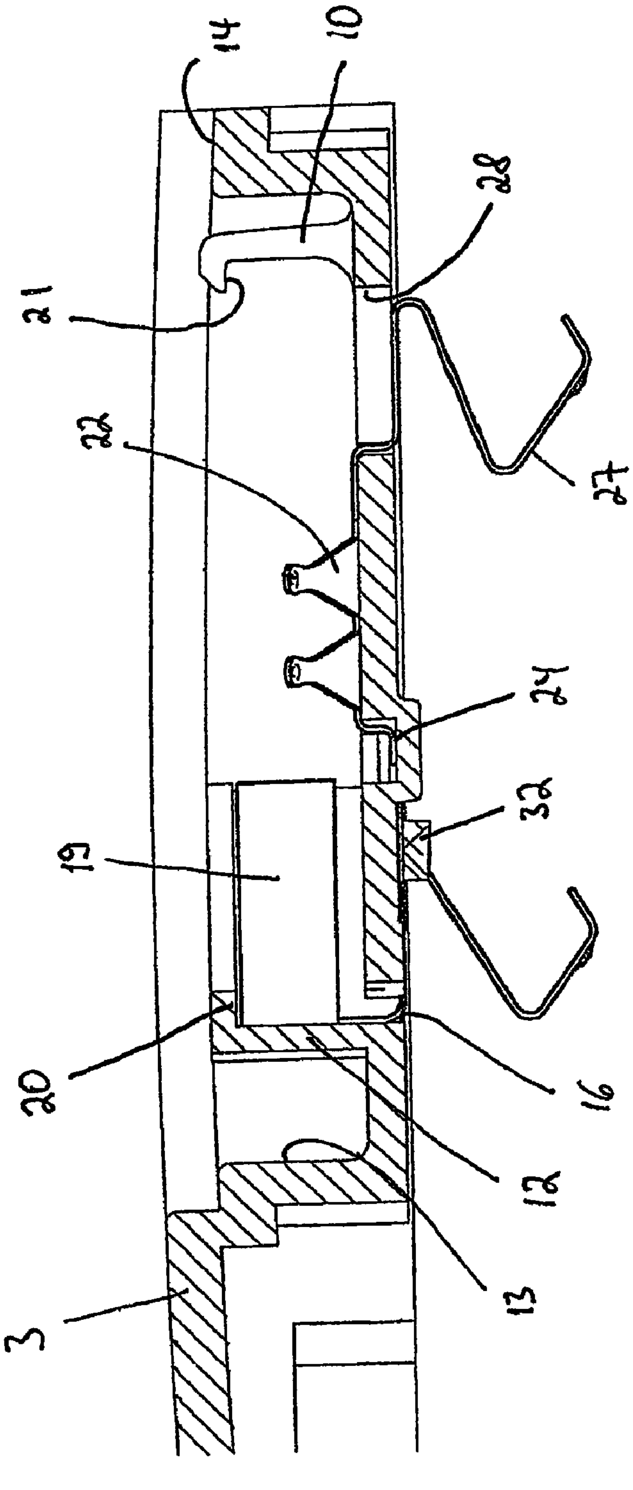
FIG. 4: shows a cross section A-A through the holding apparatus

FIG. 4 shows the lower shell 3 in the preassembled state, in the form of a section, for illustrative purposes.

The invention claimed is:

1. A holding and contact-making apparatus capable of use with a button cell, comprising:
- a housing that is open at a top and that is composed of plastic; and
- contact elements that are arranged in the housing in order to make contact with button cell poles of the button cell when the button cell is inserted into the housing;
- wherein the contact elements are passed out of the housing through at least one recess in a bottom of the housing in order to make contact with an electronics assembly outside of the housing;
- wherein the contact elements form a force-fitting connection to the electronics assembly outside of the housing;
- wherein the contact elements are leaf-spring elements; and
- wherein the contact elements are bent in an S-shape in an end in order to make contact with the electronics assembly.

2. The apparatus as claimed in claim 1, characterized in that a button cell contact pad and an electronics contact pad of at least one of the contact elements are at right angles to one another.

3. The apparatus as claimed in claim 2, characterized in that a pole contact part of at least one of the contact elements is passed from an inside of the housing through a recess in the bottom of the housing.

4. The apparatus as claimed in claim 3, characterized in that at least one of the contact elements is held in position in an interlocking manner.

5. The apparatus as claimed in claim 3, characterized in that at least one of the contact elements is fixed to the housing by stamping the plastic of the bottom.

6. The apparatus as claimed in claim 2, characterized in that at least one of the contact elements is fixed to the housing by stamping the plastic of the bottom.

7. The apparatus as claimed in claim 1, characterized in that the at least one recess in the bottom of the housing is in the form of a slot.

8. The apparatus as claimed in claim 7, characterized in that the slot extends over a subarea along a supporting wall.

9. The apparatus as claimed in claim 8, characterized in that at least one of the contact elements is fixed to the housing by stamping the plastic of the bottom.

10. The apparatus as claimed in claim 7, characterized in that a pole contact part of at least one of the contact elements is passed from an inside of the housing through the slot.

11. The apparatus as claimed in claim 7, characterized in that at least one of the contact elements is fixed to the housing by stamping the plastic of the bottom.

12. The apparatus as claimed in claim 1, characterized in that spring holding elements are integrated in an internal area of the housing, which houses the button cell, in order to hold the inserted button cell.

13. The apparatus as claimed in claim 12, characterized in that the spring holding element is a sprung hook that projects out of the bottom of the housing.

14. The apparatus as claimed in claim 1, characterized in that a pole contact part of at least one of the contact elements is passed from an inside of the housing through the recess.

15. A remote-control apparatus for locking/unlocking of locks and closures on motor vehicles, characterized in that the remote-control apparatus has at least one holding and contact-making apparatus for a button cell as claimed in one of the preceding claims.

16. The remote-control apparatus as claimed in claim 15, characterized in that an electronics assembly is arranged under the holding and contact-making apparatus, and mating contact points for making contact with contact elements of the button cell are arranged on the electronics assembly, with an electronic contact pad of the contact elements being pressed against the mating contact point in the installed state.

17. A holding and contact-making apparatus capable of use with a button cell, comprising:

a housing that is open at a top and that is composed of plastic; and contact elements that are arranged in the housing in order to make contact with button cell poles of the button cell when the button cell is inserted into the housing;

wherein the contact elements are passed out of the housing through at least one recess in a bottom of the housing in order to make contact with an electronics assembly outside of the housing;

wherein the contact elements form a force-fitting connection to the electronics assembly outside of the housing; and wherein a button cell contact pad and an electronics contact pad of at least one of the contact elements are at right angles to one another.

* * * * *